US005125732A

United States Patent [19]

Jacobson et al.

[11] Patent Number: 5,125,732

[45] Date of Patent: Jun. 30, 1992

[54] MOTION PICTURE EXHIBITION FACILITY

[76] Inventors: Larry L. Jacobson, 6300 Oakview, Shawnee, Kans. 66216; Eugene T. Patronis, 1774 Northridge Rd., Dunwoody, Ga. 30350

[21] Appl. No.: 603,895

[22] Filed: Oct. 25, 1990

Related U.S. Application Data

[62] Division of Ser. No. 213,522, Jun. 30, 1988, Pat. No. 5,004,067.

[51] Int. Cl.[5] .............................................. G03B 31/00

[52] U.S. Cl. .......................................... 352/11; 352/1; 352/3; 352/36

[58] Field of Search ............................ 352/1, 3, 11, 36

[56] References Cited

U.S. PATENT DOCUMENTS

| | | |
|---|---|---|
| 1,447,855 | 3/1923 | Johnson . |
| 1,486,650 | 3/1924 | Foley . |
| 1,684,975 | 9/1928 | Slepian . |
| 1,688,744 | 10/1928 | Nicolson . |
| 1,754,506 | 4/1930 | Flynn . |
| 1,820,137 | 8/1931 | Hanna . |
| 1,901,202 | 3/1933 | Thomas . |
| 1,923,072 | 8/1933 | Bowen . |
| 1,945,710 | 2/1934 | Smoot . |
| 1,951,692 | 3/1934 | Evens . |
| 1,955,682 | 4/1934 | Newman et al. . |
| 1,990,754 | 2/1935 | Ross . |
| 1,992,268 | 2/1935 | Wente . |
| 2,008,712 | 7/1935 | Hammond, Jr. . |
| 2,089,391 | 8/1937 | Marion . |
| 2,122,587 | 7/1938 | Ringel . |
| 2,269,284 | 1/1942 | Olson . |
| 2,295,527 | 9/1942 | Bowley . |
| 2,539,672 | 1/1951 | Olson et al. . |
| 2,638,510 | 5/1953 | Brami . |
| 2,761,913 | 9/1956 | Manley . |
| 2,778,874 | 1/1957 | Mueller . |
| 2,815,087 | 12/1957 | Delort . |
| 3,014,402 | 12/1961 | Bragg . |
| 3,028,927 | 4/1962 | Levy et al. . |
| 3,065,816 | 11/1962 | Ranger . |
| 3,131,783 | 5/1964 | Mares . |
| 3,356,179 | 12/1967 | Tompkins . |
| 3,918,551 | 11/1975 | Rizo-Patron . |
| 4,091,891 | 5/1978 | Hino et al. . |
| 4,112,256 | 9/1978 | Carleson . |
| 4,134,471 | 1/1979 | Queen . |
| 4,158,400 | 6/1979 | Vice . |
| 4,182,429 | 1/1980 | Senzaki . |
| 4,227,051 | 10/1980 | Thomas et al. . |
| 4,283,606 | 8/1981 | Buck . |
| 4,314,620 | 2/1982 | Gollehon . |
| 4,365,114 | 12/1982 | Soma . |
| 4,381,831 | 5/1983 | Putnam . |
| 4,401,857 | 8/1983 | Morikawa . |
| 4,469,921 | 9/1984 | Kinoshita . |
| 4,492,826 | 1/1985 | Chiu . |
| 4,497,981 | 2/1985 | House . |
| 4,552,242 | 11/1985 | Kashiwabara . |
| 4,554,414 | 11/1985 | House . |
| 4,569,076 | 2/1986 | Holman . |
| 4,619,342 | 10/1986 | Buck . |
| 4,750,808 | 6/1988 | Nash et al. . |

OTHER PUBLICATIONS

Englebretson et al., "Cinema Sound Reproduction Systems", SMPTE Journal; Nov. 1982, pp. 1046–1057.

*Primary Examiner*—Monroe H. Hayes
*Attorney, Agent, or Firm*—Litman, McMahon & Brown

[57] ABSTRACT

A cinema sound system for upperforated screens includes for each sterophonic channel a floor positioned direct radiator bass speaker unit radiating into quarter space and an upper frequency speaker unit mounted above the screen. Each upper frequency speaker unit includes a middle frequency driver mounted in a sealed rear enclosure which is attached to the throat of a middle frequency horn. A constant directivity high frequency horn with a high frequency driver attached to a rear end is mounted coaxially in the middle frequency horn. Sharp cutoff active crossover filters divide the input signal into low, middle, and high frequency band signals which are separately power amplified. The middle frequency horn is adapted to function as a direct radiator at a lower end of the middle band and as a sectoral horn above an unloading frequency of the middle frequency horn. The middle frequency horn is contoured such that with the high frequency horn in place, unobstructed cross sectional areas grow exponentially from the throat to the mouth of the middle frequency horn.

14 Claims, 3 Drawing Sheets

39
45
50
51
53
54
55
56
57
58
59
60
64
65
7

MOTION PICTURE EXHIBITION FACILITY

CROSS-REFERENCE TO RELATED APPLICATION

The present application is a divisional application of parent application Ser. No. 07/213,522 filed Jun. 30, 1988 having a title of MOTION PICTURE EXHIBITION FACILITY, now U.S. Pat. No. 5,004,067.

FIELD OF THE INVENTION

The present invention relates to cinema sound systems and, more particularly, to such a sound system suitable for use with non-perforated screens.

BACKGROUND OF THE INVENTION

Currently, conventional motion picture theater screens are flat and perforated, and the main speaker units which project the sound tracks on motion picture films are placed behind such perforated screens at about two thirds the height of the screen. The principal advantage of such placement is felt to be that it enhances the illusion that the origin of those frequency components of the sound program which contain directional information, particularly vocal parts, are emanating from the actors visual images on the screen. The perforated screen is acoustically transparent to such lower frequencies, such that there is little loss in sound quality at these frequencies. However, at frequencies, the perforated screen becomes increasingly reflective acoustically. The reflected energy can be re-reflected by surfaces behind the screen, in some theaters, thereby altering the high frequency response and sound localization and confusing stereo imaging.

One of the disadvantages of flat screens is that off-axis light rays from the projector tend to be reflected divergingly away from the audience resulting in low perceived brightness in the corners of the screen to viewers sitting off the center line of the theater. This problem is compounded by the fact that off-axis rays must travel somewhat longer distances to the flat screen than axial rays. To overcome this problem, screens cylindrically curved about a vertical axis have been devised which, to an extent, increase the brightness of corner areas of the images on the screen to viewers sitting toward the sides of the theater. An inherent disadvantage of perforated screens, whether flat or curved, is that light rays which enter the perforations of the screen are not available for reflection toward the viewers. Thus, perforated screens are not efficient reflectors of light.

In order to improve the reflection efficiency of movie screens, the Stewart Filmscreen Corporation of Torrance, Calif. has developed what is referred to as a large compound curved screen. The screen itself is an unperforated sheet of a vinyl material which closes a side of an enclosure. A vacuum is pulled on the enclosure which draws the screen material into an externally concave spherical shape. With a film projector at the center of the sphere, there is virtually no variation in the ray distance from the projector to the screen. And while a vertically cylindrical screen improves the lateral brightness consistency, the Stewart screen improves both the lateral and vertical brightness consistency. A significant additional improvement is that since the screen material is unperforated, an increased reflectance surface is available for a given screen area relative to a perforated screen. Thus, a lower projection bulb intensity is required for a given screen brightness compared to perforated screens.

Unfortunately, while the Stewart screen has significantly improved the visual presentation of films, it has created somewhat of a problem for the audio component. The size of the preferred screen enclosure does not provide sufficient room for conventional speaker enclosures behind the screen. Even if such space were available, the unperforated nature of the screen material would severely restrict the transmission of higher frequency portions of the sound tracks.

SUMMARY OF THE INVENTION

The present invention provides a sound system which is particularly adapted for use with such an unperforated movie screen. The system includes a bass speaker unit and a mid-to-high or upper frequency speaker unit for each stereophonic channel of the sound track format employed. The bass speaker units function as direct radiators and are arrayed across the screen and are positioned on a floor therebelow. The upper frequency speaker units are placed above the screen in general alignment with the bass speaker units and are oriented to optimally acoustically excite the audience seating area of the theater.

Each upper frequency speaker unit includes a middle frequency horn and driver and a coaxially mounted high frequency horn and driver. The middle frequency driver is mounted in a sealed rear enclosure which is attached to the throat of the middle frequency horn. The high frequency horn has its driver attached thereto and the combination is mounted along the projection axis of the middle frequency driver on posts extending across the mouth of the middle frequency horn. The high frequency horn is a constant directivity type horn and has a dispersion pattern of about 90 degrees laterally by 40 degrees vertically.

The middle frequency horn is adapted to function as a direct radiator below an unloading frequency thereof and increasingly as a sectoral horn above the unloading frequency. The middle frequency horn is contoured such that with the high frequency horn in place, unobstructed cross sectional areas of the middle frequency grow exponentially.

The system according to the present invention includes active crossovers for dividing each main sound track signal into a low frequency band, a middle frequency band, and a high frequency. The crossover filters are sharp cutoff filters, such as fourth order Butterworth filters. The high frequency path includes a delay circuit to compensate for delay introduced in the middle frequency signal due to the physical positioning of the drivers in the upper frequency unit. High frequency equalization is provided to compensate for the characteristic upper range roll-off of the high frequency driver. Finally, a level adjustment circuit is provided in the high frequency path to match the power response of the high frequency driver to that of the middle frequency driver at the middle to high frequency crossover point.

OBJECTS OF THE INVENTION

The principal objects of the present invention are: to provide an improved speaker system; to provide such a system which is particularly well adapted for use with unperforated motion picture theater screens; to provide such a system including a constant directivity high frequency driver and horn mounted coaxially within a middle frequency horn in front of a middle frequency driver; to provide such a system wherein the high and middle frequency horns are shaped to have similar lateral dispersion patterns; to provide such a system in which the middle frequency horn is shaped such that unobstructed cross sectional areas vary exponentially with the high frequency horn in place; to provide such a system including a separate direct radiator low frequency or bass unit; to provide such a system with a substantially flat frequency response across the audible spectrum; to provide such a system including active crossover filters and separate power amplifiers which direct a low frequency range to a bass driver of the bass unit, a middle frequency range to the middle frequency driver, and a high frequency range to the high frequency driver; to provide such a system wherein the middle frequency driver and horn cooperate to function as a direct radiator below a loading frequency of the middle frequency horn and as a sectoral horn above the loading frequency; to provide such a system including a delay circuit in the high frequency signal path for phase coherence of the high frequency with signals through the middle frequency path; to provide a plurality of such systems for use in reproducing a stereophonic sound track of a motion picture film; to provide a motion picture exhibition facility including such a cinema sound system in combination with an unperforated, compound curved movie screen; to provide such a facility wherein for each sound track channel, an upper frequency unit including the coaxially mounted high and middle frequency horns and drivers is positioned above the unperforated screen and a bass unit is positioned on a floor below the screen; to provide such a facility which does not adversely affect the perceived sound localization relative to the visual images of figures projected onto the screen; to provide such a system which is adaptable for use with a conventional perforated screen with superior results; to provide such a system which is applicable to live stages, both indoor and outdoor, with superior results; and to provide such a speaker system which is economical to manufacture, efficient in performance, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
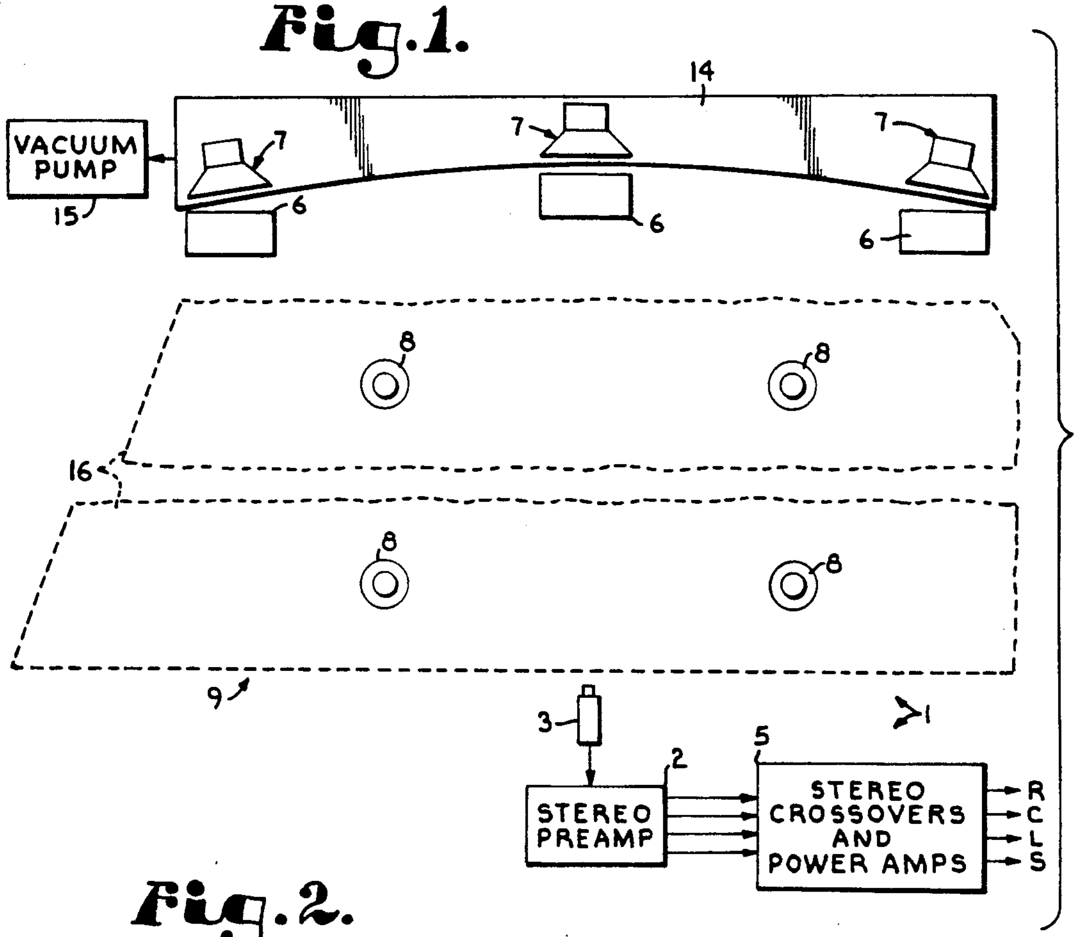
FIG. 1 is a diagrammatic plan view of a plurality of the cinema sound systems of the present invention installed in combination with a compound curved cinema screen in a theater.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a cinema sound system according to the present invention. The system 1 generally includes a stereophonic preamplifier 2 of a motion picture film projector 3 which derives sound track signals from a film 4, stereophonic crossovers and power amplifiers 5, a plurality of bass speaker units 6, a plurality of mid/high or upper frequency speaker units 7, and a plurality of surround or ambience speakers 8 which may be mounted in a ceiling (not shown) or side walls (not shown) of an auditorium or theater. The system 1 is particularly well adapted for use in a motion picture film exhibition facility or theater 9 employing an unperforated, compound curved motion picture screen 10.

Figure 2:
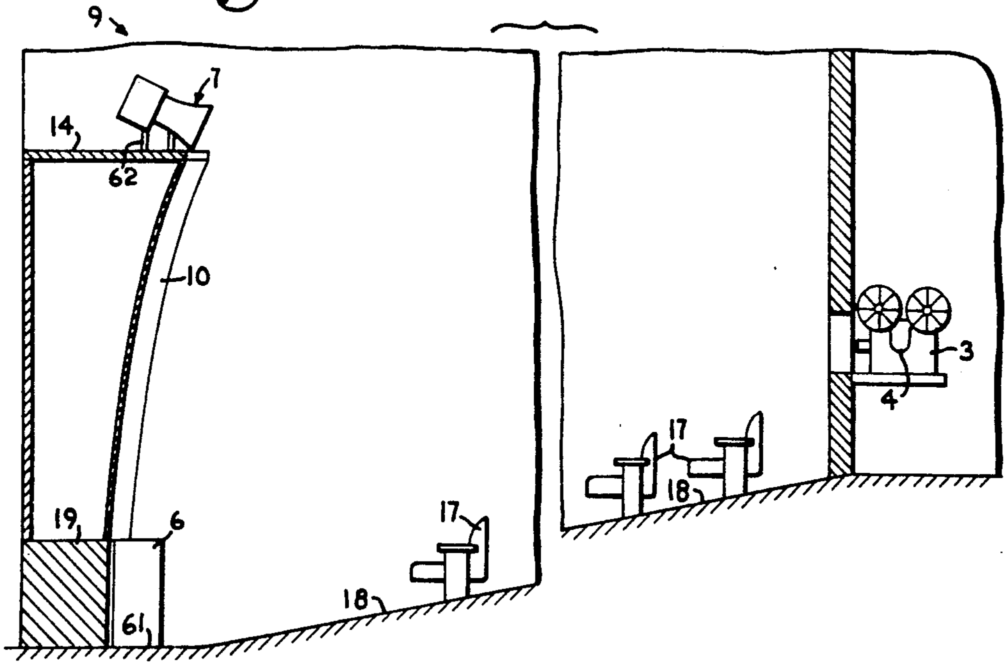
FIG. 2 is a diagrammatic side elevational view of the installation shown in FIG. 1 and illustrates the compound curved screen in cross section.

Referring to FIGS. 1 and 2, the illustrated screen 10 is mounted in a rigid screen enclosure 14 positioned at an opposite end of the theater 9 from the projector 3. The screen 10 is formed of a flexible vinyl material which is stretched across one side of the enclosure 14. A vacuum pump 15 communicates with the enclosure 14 and creates a low vacuum within it to draw the screen 10 inward to assume an externally concave spherical shape. The screen 10 is sized according to the geometry of the theater 9 in which it is installed and is preferably wider than tall to accommodate high aspect ratio film formats. In conventional theaters 9 the seating areas 16 are somewhat fan shaped, and the seats 17 are positioned on a floor 18 which is ramped from the screen toward the rear. The enclosure 14 may be raised somewhat for better visibility and may be mounted on a shallow stage 19 or attached to a wall (not shown). The screen 10 is illustrated as being tilted forward, again for better visibility. In theaters with balconies, such tilting of the screen 10 might not be desirable since this might reduce its visibility to balcony viewers.

Figure 6:
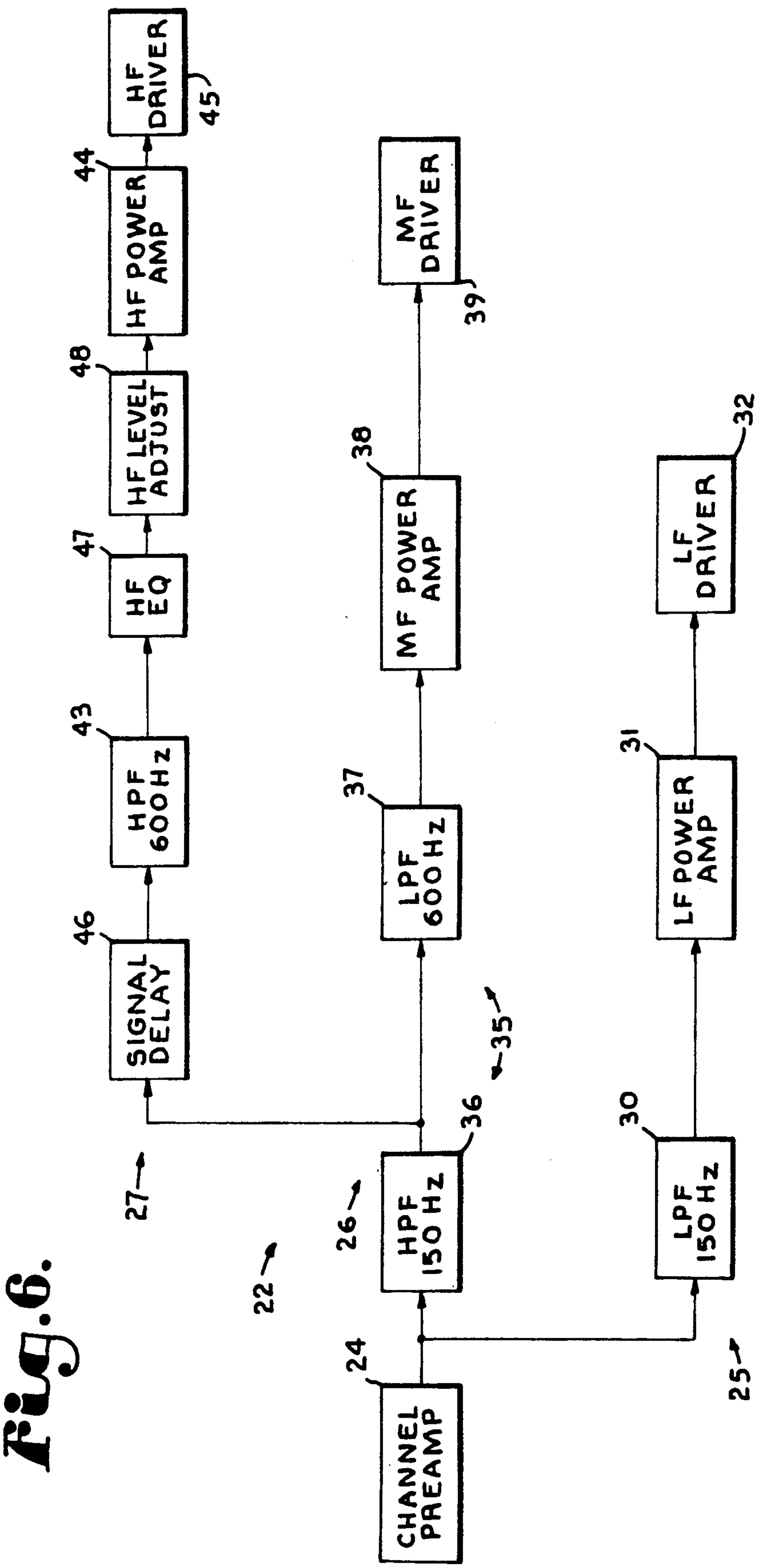
FIG. 6 is a block diagram of one channel of the cinema sound system of the present invention and illustrates active crossover filters employed therein.

In dealing with modern sound tracks, the cinema sound system must have a bandwidth from at least 30 Hertz to 15,000 Hertz. For reasons of efficiency and directional control, this spectrum must be divided into low frequency, middle frequency, and high frequency bands. FIG. 6 illustrates a single main channel 22 of the stereophonic sound system 1. The system 1 may include three or five stereophonic main channels 22 according to the sound and film format employed and additionally a surround or ambience channel. A three channel system is illustrated in the figures, including a left channel, a center channel, and a right channel; however, the expansion of the present invention to a five channel system will be readily understood.

Each channel includes a channel preamplifier 24 which may be incorporated into a sound track sensing mechanism (not shown) within the cinema projector 3. A channel sound track audio signal from the preamplifier 24 is divided into a low frequency signal by a low frequency or bass path 25, a middle frequency signal by a middle frequency or middle path 26, and a high frequency signal by a high frequency or high path 27. The signals are divided by active crossover filters which are preferably fourth order Butterworth filters yielding sharp cutoffs with ultimate slopes of about −24 dB per octave. The bass path 25 includes a low pass filter with a cutoff frequency of 150 Hertz, a low frequency power amplifier 31, and a low frequency driver speaker 32 which is mounted in the bass unit 6. The low frequency driver 32 is preferably an 18 inch piston driver or speaker mounted in a vented enclosure to form the bass unit 6. The choice of a cutoff frequency of 150 Hertz excludes any vocal frequencies from the bass path 25.

The middle path 26 includes a bandpass filter 35 including a high pass filter 36 with a cutoff frequency of 150 Hertz and a low pass filter 37 with a cutoff frequency of 600 Hertz. A middle frequency power amplifier 38 and a middle frequency driver 39 complete the middle path 26. The high path 27 begins at a pickoff point between the high pass filter 36 and the low pass filter 37 of the middle path 26. The high path 27 includes a high pass filter 43 with a cutoff frequency of 600 Hertz, a high frequency power amplifier 44, and a high frequency driver 45. Additional elements in the high path 27 include a signal delay circuit 46, a high frequency equalization circuit 47, and a high frequency level adjustment 48, the operation of which will be detailed below. The middle and high frequency drivers 39 and 45 are acoustically coupled respectively to a middle frequency horn 50 and a high frequency horn 51 to form the upper frequency speaker unit 7.

Figures 3, 4, 5:
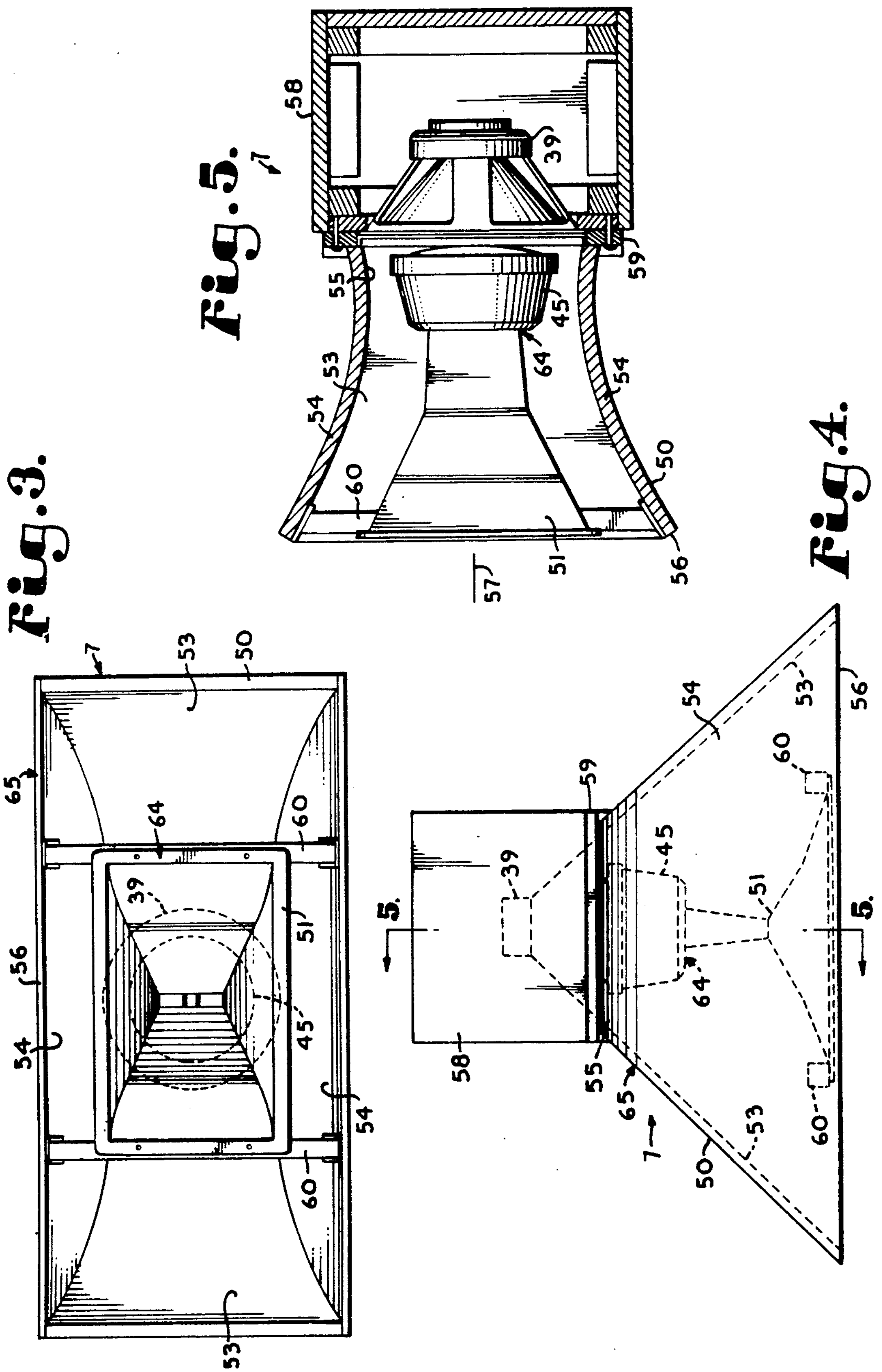
FIG. 3 is a front elevational view of an upper frequency speaker unit of a cinema sound system according to the present invention.
FIG. 4 is a top plan view of the upper frequency speaker unit with a middle frequency driver and a high frequency horn and driver shown in phantom.
FIG. 5 is a vertical cross sectional view of the upper frequency speaker unit taken on line 5—5 of FIG. 4 at a somewhat enlarged scale and shows the middle frequency driver and the high frequency horn and driver.

Referring to FIGS. 3–5, the middle frequency horn 50 is formed of opposite side walls 53 and opposite top and bottom walls 54 to define a throat 55 at a rear end of the horn 50 and a mouth 56 at a front end. The side walls 53 are substantially planar and diverge at about 45 degrees on either side of a projection axis 57 of the horn 50 from the throat 55 to the mouth 56. The top and bottom walls 54 are curved in cross section and also diverge toward the mouth 56. The middle frequency driver 39 is a 12 inch piston driver mounted in a sealed rear enclosure 58. Preferably, the middle frequency driver 39 is a model DL12X manufactured by Electro-Voice, Inc. of Buchanan, Mich. The enclosure 58 with driver 39 therein is mounted on the middle frequency horn 50 by means of a back plate 59 to position the driver 39 coaxial with the horn 50. The middle frequency horn 50 is preferably constructed of three-quarter inch void-free birch plywood or an equivalent. Alternatively, it may be formed of fiberglass or the like.

The high frequency horn 51 is a constant directivity type horn and is mounted within the middle frequency horn 50 coaxial with the middle frequency driver 39 by a pair of mounting posts 60 extending between the top and bottom walls 54 near the mouth 56 of the middle frequency horn 50. The high frequency driver 45 is attached to a rear end of the horn 51 coaxial with the middle frequency driver 39. The high frequency horn 51 is preferably an Electro-Voice model HP 940 horn; and the high frequency driver 45 is an Electro-Voice model DH1A high frequency compression driver. This driver has a typical power response which falls off at about −6 dB per octave above a break point frequency. The equalization circuit 47 (FIG. 6) is provided to compensate for this characteristic to thereby flatten the response of the high frequency horn and driver.

Space constraints as well as acoustical considerations require that the bass units 6 be positioned on a floor 61 beneath the screen 10. The acoustic signals from the bass units 6 radiate nondirectionally into a solid angle of about half pi (3.14159/2) steradians, or quarter space, from this position. The 18 inch bass driver 32 is mounted in a conventional vented enclosure with an alignment which yields a lower frequency cutoff of about 28 Hertz. The human hearing mechanism does not derive directional information from the portion of the spectrum reproduced by the bass units 6 (below 150 Hertz) such that there is no requirement for precisely aiming the bass units 6.

The upper frequency units 7 are mounted immediately above the screen 10, as by brackets 62 which attach them to the screen enclosure 14. The center upper frequency unit 7 is aimed straight ahead, while the left and right units 7 are angled inwardly somewhat. All the upper frequency units 7 are declined somewhat for better coverage of the audience seating areas 16. The optimal orientations and declinations depend on the particular theaters 9 in which the system 1 is installed. The "upper" frequency units 7 reproduce the spectrum from 150 Hertz to beyond 15,000 Hertz. All directional information is contained in this portion of the audible spectrum. The above-the-screen position, rather than behind the screen 10, is not detrimental to the desired auditory-visual illusion of sound originating from the point of action on the screen because, whereas the human hearing mechanism is very acute to lateral localization, it is relatively insensitive to vertical localization.

Constant directivity type horns are employed in the high frequency assemblies or speakers 64, each including a high frequency horn 51 and driver 45, to sharply restrict the coverage patterns to the seating area 16. The horns 51 have acoustic patterns of about 90 degrees horizontally by 40 degrees vertically. Thus, little acoustical energy in the high frequency band is directed either toward the auditorium ceiling or sidewalls, allowing the system 1 to perform successfully in auditoria with poor absorptive treatments in these areas. Most of the acoustical energy is absorbed directly by the seating area 16 with little attendant excitation of the auditorium reverberant field. The audience clearly hears the sound mix of the film without the diffusive interference of an auditorium reverberant field.

A very large burden is placed on the middle frequency assembly or speaker 65, each including a middle frequency driver 39 and horn 50. In order for the sound to seem natural, there must be a "seamless" transition between the frequency bands. The middle frequency speakers 65 must match the bass units 6 at the lower end of the middle frequency band (150 Hertz to 600 Hertz) and must match the high frequency speaker 64 at the upper end of the middle frequency band. That is, the middle frequency speaker 65 must behave acoustically as a piston radiating into a solid angle of half pi steradians in the vicinity of 150 Hertz and must behave acoustically as a horn with well defined vertical and horizontal or lateral coverage angles in the vicinity of the upper crossover frequency of the middle frequency band.

In order to preserve overall phase response throughout crossover to the high frequency speaker 64, the origin of the middle frequency signals must be at the same point both in space and time. This requires that the acoustic centers of both the middle and high frequency speakers 65 and 64 occur at the same physical point in space, at least for frequencies in the vicinity of the crossover between the two devices. By choosing the middle to high crossover frequency at 600 Hertz, it is possible to design a middle frequency horn 50 which allows coaxial mount of the high frequency speaker 64 and satisfies the space constraints of the above-the-screen position. A suitable choice of aspect ratio, lower range cutoff, and bandpass filter network for the middle frequency horn 50 satisfies the required match with the bass unit 6. A suitable bandpass filter network, high pass filter network, and signal delay for the high frequency horn 51 along with the coaxial mounting satisfies the acoustic center requirement.

The middle frequency speaker 65 combines the 12 inch piston driver 39 mounted in the sealed rear enclosure 58 with the modified front loading sectoral exponential horn 50. The shape of the middle frequency horn 50 is modified so that the unobstructed cross sectional area growth rate is exponential when the coaxially mounted high frequency horn 51 is in place. The high frequency driver 45 is positioned immediately in front of the middle frequency driver 39 and is treated as a phase plug in the sectoral horn design. The low frequency unloading point, or frequency below which the horn 51 ceases to function as a horn, is set at the square root of two (1.414) times the low frequency crossover point of 150 Hertz.

At the low to middle crossover frequency (150 Hertz), the middle frequency speaker 65 acts as a direct radiator with an additional reactance contributed by the horn 50. At one octave above the low frequency crossover point, the middle frequency speaker 65 has become horn loaded, a condition which continues with increasing effect as the frequency increases toward the middle to high frequency crossover point (600 Hertz), with a horn's associated directional characteristics. Above the unloading frequency, the horn 50 has a dispersion pattern of about 90 degrees laterally by 40 degrees vertically. The volume of the sealed rear enclosure 58 is chosen to ensure that the motion of the middle frequency driver 39 is mass controlled when it is operating as a direct radiator.

Referring to FIG. 6, each of the active crossover filters is two cascaded sections of identical second order Butterworth filters. With the illustrated arrangement, the resulting group delays in both the high frequency path 27 and the middle frequency path 26 will be identical, and no differential signal time shift will have been introduced in these paths. Since the high frequency speaker 64 is physically in front of the middle frequency speaker 65 by a distance on the order of an inch, depending on the types employed, the outputs can be brought into time alignment for phase coherence by the signal delay circuit 46 having a delay on the order of 75 microseconds, depending on the spacing of the elements within the upper frequency unit 7. The delay circuit 46 may be any type of circuit which furnishes nearly flat amplitude in the audible range and which also introduces a phase shift which decreases linearly with increasing frequency. Multiple sections of high order, low pass Bessel filters with sufficiently high cutoff frequencies have this characteristic. The illustrated delay circuit is a ninth order Bessel filter with a cutoff frequency of about 25,000 Hertz.

The level adjustment circuit 48 is provided to normalize the high frequency output to that of the middle frequency output in the vicinity of the crossover between the middle frequency speaker 65 and the high frequency speaker 64.

The system 1 has been adapted particularly for use with unperforated cinema screens, such as the vacuum supported, compound curved screen 10. However, the system 1 may also be used with conventional flat perforated screens with no modification if the upper frequency units 7 are placed above such a screen. If the upper frequency units 7 are placed behind a perforated screen, the equalization circuit 47 will have to be adjusted accordingly to compensate for the high frequency filtering effect of the perforated screen. The sound system 1 may also be used with superior results in other sound reproduction applications, such as live stages both indoor and outdoor.

It is to be understood that while certain forms of the present invention have been illustrated and described herein, it is not to be limited to the specific forms or arrangement of parts described and shown.

What is claimed and desired to be secured by Letters Patent is as follows:

1. A motion picture theater comprising:

(a) a seating area for an audience;

(b) a motion picture projection screen positioned in facing relation to said seating area for viewing by said audience and including an exhibition floor;

(c) a sound channel of a motion picture film projector deriving said program signal from a sound track of a motion picture film being projected providing at least one electrical program signal; and (d) at least one audio system receiving said program signal and converting same to an acoustical signal for projection toward said seating area and hearing by said audience, said audio system including:

(1) a middle frequency horn having a projection axis and a substantially horizontal dispersion pattern at frequencies above a loading frequency of said middle frequency horn;

(2) a middle frequency driver;

(3) a sealed rear enclosure having said middle frequency driver mounted therein;

(4) said sealed rear enclosure being mounted on said middle frequency horn to acoustically couple said middle frequency driver to said middle frequency horn;

(5) a substantially lateral dispersion, high frequency horn mounted coaxially within said middle frequency horn in front of said middle frequency driver;

(6) a high frequency driver mounted in said high frequency horn along said projection axis;

(7) said middle frequency driver and horn and said high frequency driver and horn combining to form an upper frequency unit which is oriented to acoustically project toward said seating area;

(8) a direct radiator bass speaker unit including a bass driver positioned on said exhibition floor and oriented generally toward said audience; and (9) amplifier means connected to each of said drivers and applying said program signal thereto.

2. A motion picture exhibition facility comprising:

(a) a seating area for an audience;

(b) a motion picture screen positioned in facing relation to said seating area for viewing by said audience and having a stage area floor therebelow;

(c) a motion picture film projector positioned in spaced relation to said screen to project a motion picture thereto and including sound channel means to derive at least one sound track signal from a motion picture film during projection of said film by said projector;

(d) at least one audio system receiving said sound track signal and converting same to an acoustical signal for projection toward said seating area and hearing by said audience, said audio system including:

(1) a middle frequency horn having a projection axis and a substantially horizontal dispersion pattern at frequencies above a loading frequency of said middle frequency horn;

(2) a middle frequency driver;

(3) a sealed rear enclosure having said middle frequency driver mounted therein;

(4) said sealed rear enclosure being mounted on said middle frequency horn to acoustically couple said middle frequency driver to said middle frequency horn;

(5) a substantially lateral dispersion, high frequency horn mounted coaxially within said middle frequency horn in front of said middle frequency driver;

(6) a high frequency driver mounted in said high frequency horn along said projection axis;

(7) said middle frequency driver and horn and said high frequency driver and horn combining to form an upper frequency unit which is oriented to acoustically project toward said seating area;

(8) a direct radiator bass speaker unit including a bass driver positioned on said exhibition floor and oriented generally toward said audience; and (9) amplifier means connected to each of said drivers and applying said program signal thereto; and (e) each audio system having components thereof oriented to optimally project sound toward said seating area.

3. A facility as set forth in claim 2 wherein said amplifier means includes:

(a) crossover means dividing said sound track signal into a low frequency range signal to be applied to said bass driver, a middle frequency range signal to be applied to said middle frequency driver, and a high frequency range signal to be applied to said high frequency driver.

4. A facility as set forth in claim 2 wherein said amplifier means includes:

(a) a bass power amplifier, a middle frequency power amplifier, and a high frequency power amplifier connected respectively to said bass, middle frequency, and high frequency drivers; and (b) active crossover means dividing said sound track signal into a low frequency range signal to be applied to said bass driver, a middle frequency range signal to be applied to said middle frequency driver, and a high frequency range signal to be applied to said high frequency driver.

5. A facility as set forth in claim 2 wherein:

(a) said middle frequency horn is sized and shaped such that below said loading frequency said middle frequency horn and driver cooperate to behave acoustically as a direct radiator and above said loading frequency said middle frequency horn and driver cooperate to behave acoustically as a sectoral horn having a dispersion pattern similar to a high frequency dispersion pattern of said high frequency horn.

6. A facility as set forth in claim 2 wherein:

(a) said middle frequency horn has a throat at a rear end and a mouth at a front end thereof; and (b) said middle frequency horn is contoured such that, with said high frequency horn positioned therein, unobstructed cross sectional areas within said middle frequency horn vary substantially exponentially from said throat to said mouth.

7. A facility as set forth in claim 2 including:

(a) a plurality of said audio systems spaced across said screen, each audio system having components thereof oriented to optimally project sound toward said seating area;

(b) said sound channel means is stereophonic and provides a plurality of sound track signals; and (c) each of said audio systems converts a respective sound track signal to an acoustical signal for projection toward said seating area.

8. A facility as set forth in claim 7 wherein said sound channel means includes:

(a) a surround channel providing a surround channel signal; and (b) surround channel speaker means connected to said surround channel and oriented toward said seating area to project an acoustical surround signal toward said seating area.

9. A facility as set forth in claim 2 wherein:

(a) said screen is non-perforated;

(b) said upper frequency unit is positioned above said screen; and (c) said bass speaker unit is positioned on said stage area floor generally below said upper frequency unit.

10. A facility as set forth in claim 2 wherein:

(a) said screen is a non-perforated, compound curved screen;

(b) said upper frequency unit is positioned above said screen; and (c) said bass speaker unit is positioned on said stage area floor generally below said upper frequency unit.

11. A facility as set forth in claim 2 wherein:

(a) said screen is perforated and has an acoustical filtering effect to sound propagated therethrough above a characteristic screen cutoff frequency;

(b) said upper frequency unit is positioned behind said screen with respect to said seating area; and (c) said amplifier means includes equalization means to compensate for said acoustical filtering effect.

12. A motion picture exhibition facility comprising:

(a) a seating area for an audience;

(b) a non-perforated motion picture screen positioned in facing relation to said seating area for viewing by said audience;

(c) a motion picture film projector positioned in spaced relation to said screen to project a motion picture thereto and including sound channel means to derive a sound track signal from a motion picture film during projection of said film by said projector;

(d) an upper frequency speaker unit positioned above said screen, connected to said sound channel means, and oriented to project an upper frequency component of an acoustical sound track signal toward said seating area, said upper frequency speaker unit non-directionally radiating sound near the lower end of said upper frequency component and directionally radiating sound near the upper end of said upper frequency component with well defined vertical and lateral audience coverage angles; and (e) a non-directionally radiating lower frequency speaker unit positioned below said screen, connected to said sound channel means, and oriented to project a lower frequency component of said acoustical sound track signal toward said seating area.

13. A facility as set forth in claim 12 wherein:

(a) said screen is a compound curved motion picture screen.

14. A motion picture exhibition facility comprising:

(a) a seating area for an audience;

(b) a non-perforated, compound curved motion picture screen positioned in facing relation to said seating area for viewing by said audience and having a stage area floor therebelow;

(c) a motion picture film projector positioned in spaced relation to said screen to project a motion picture thereto and including stereophonic sound channel means to derive a left channel sound track signal, a center channel sound track signal, and a right channel sound track signal from a motion picture film during projection of said film by said projector;

(d) a left channel audio system, a center channel audio system, and a right channel audio system receiving said left, center, and right channel sound track signals respectively and converting same to respective acoustical signals for projection toward said seating area and hearing by said audience, each of said audio systems including:

(1) a middle frequency horn having a projection axis and a substantially horizontal dispersion pattern at frequencies above a loading frequency of said middle frequency horn;

(2) a middle frequency driver;

(3) a sealed rear enclosure having said middle frequency driver mounted therein;

(4) said sealed rear enclosure being mounted on said middle frequency horn to acoustically couple said middle frequency driver to said middle frequency horn;

(5) a substantially lateral dispersion, high frequency horn mounted coaxially within said middle frequency horn in front of said middle frequency driver;

(6) a high frequency driver mounted in said high frequency horn along said projection axis;

(7) said middle frequency driver and horn and said high frequency driver and horn combining to form an upper frequency unit which is oriented to acoustically project toward said seating area;

(8) a direct radiator bass speaker unit including a bass driver positioned on said exhibition floor and oriented generally toward said audience; and (9) amplifier means connected to each of said drivers and applying said program signal thereto; and (e) each audio system having components thereof oriented to optimally project sound toward said seating area.

* * * * *